United States Patent [19]

Boyle et al.

[11] Patent Number: 4,517,076

[45] Date of Patent: May 14, 1985

[54] REACTIVATION OF IRIDIUM-CONTAINING CATALYSTS

[75] Inventors: Joseph P. Boyle; John B. Gilbert, both of Sarnia, Canada

[73] Assignee: Exxon Research and Engineering Co., Florham Park, N.J.

[21] Appl. No.: 643,870

[22] Filed: Aug. 24, 1984

[51] Int. Cl.³ ............................................. B01J 23/90
[52] U.S. Cl. ................................... 208/140; 208/139; 502/37
[58] Field of Search ................... 208/139, 140; 502/37

[56] References Cited

U.S. PATENT DOCUMENTS

| | | | |
|---|---|---|---|
| 3,904,510 | 9/1975 | Sinfelt et al. | 208/140 |
| 3,937,660 | 2/1976 | Yates et al. | 208/140 |
| 3,939,061 | 2/1976 | Paynter et al. | 208/140 |
| 3,939,062 | 2/1976 | Sinfelt et al. | 208/140 |
| 3,941,682 | 3/1976 | Kmak et al. | 208/140 |
| 3,941,716 | 3/1976 | Paynter | 502/35 |
| 3,943,052 | 3/1976 | Kmak et al. | 208/140 |
| 3,981,823 | 9/1976 | Yates | 502/37 |
| 3,998,755 | 12/1976 | Hayes | 502/37 |
| 4,018,670 | 4/1977 | Sinfelt et al. | 208/140 |
| 4,046,673 | 9/1977 | Paynter et al. | 208/140 |
| 4,148,749 | 4/1979 | Halden et al. | 502/37 |
| 4,172,817 | 10/1979 | Yates et al. | 208/140 |
| 4,277,369 | 7/1981 | Courty et al. | 502/37 |
| 4,359,400 | 11/1982 | Landolt et al. | 502/53 |
| 4,444,895 | 4/1984 | Fung et al. | 208/140 |
| 4,444,896 | 4/1984 | Fung et al. | 208/140 |
| 4,444,897 | 4/1984 | Fung et al. | 208/140 |
| 4,447,551 | 5/1984 | Fung et al. | 208/140 |
| 4,467,045 | 8/1984 | Fung | 208/140 |
| 4,472,515 | 9/1984 | Fung | 208/140 |
| 4,473,656 | 9/1984 | Fung et al. | 208/140 |

Primary Examiner—Curtis R. Davis
Attorney, Agent, or Firm—Llewellyn A. Proctor

[57] ABSTRACT

A process wherein a coked, deactivated iridium-containing catalyst can be reactivated in a sequence of burn steps, inclusive of a low temperature primary burn step and a subsequent high temperature burn step. In (1) the low temperature primary burn step (i) the chloride level of the catalyst is raised and the catalyst passivated by contact with a hydrogen chloride containing gas, (ii) and coke is then burned from the catalyst by contact with a gas which contains hydrogen chloride at level sufficient to suppress iridium agglomeration at a level of oxygen providing burn temperatures which do not exceed about 425° C., this being sufficient to remove a preponderance of the coke without agglomeration of the iridium component. (2) In a high temperature secondary burn step the catalyst is subjected to (iii) a chlorination step wherein the catalyst is contacted with a hydrogen chloride containing gas sufficient to redisperse any agglomerated iridium, if any, produced during the low temperature primary burn, and raise the chloride level of the catalyst to a yet higher level for suppression of iridium agglomeration at higher temperature than 425° C., (iv) residual coke is then burned from said catalyst by contact with a gas which contains hydrogen chloride at level sufficient to suppress iridium agglomeration at a level of oxygen sufficient to provide temperatures greater than 425° C., sufficient to burn residual coke from the catalyst. The high chloride catalyst can then be (3) stripped with steam, or steam and hydrogen chloride to reduce the level of chloride.

18 Claims, No Drawings

REACTIVATION OF IRIDIUM-CONTAINING CATALYSTS

BACKGROUND OF THE INVENTION

I. Field of the Invention

This invention relates to a process for the reactivation of a catalyst comprised of iridium, or an admixture of iridium with another metal, or metals, especially platinum. In particular, the invention relates to a process for the reactivation of a catalyst, or bed of catalyst, comprised of a composite of a porous inorganic oxide support, particularly alumina, and an iridium metal or admixture of said metal with other metals, particularly platinum, or admixture of iridium and platinum with another metal, or metals, which has been deactivated by coke deposits thereupon.

II. Background and Prior Art

The petroleum industry has been commercially employing reforming, or hydroforming processes for upgrading virgin or cracked naphthas to produce high octane products for many years. In reforming, a dual-functional catalyst, or catalyst having an acid function and hydrogenation-dehydrogenation function, is employed. A metal component, or components, is substantially atomically dispersed upon the surface of a porous, inorganic oxide support, notably alumina, to provide the necessary hydrogenation-dehydrogenation function. Platinum catalysts, particularly metal promoted platinum catalysts, are currently employed, reforming being defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclication of paraffins and olefins to yield aromatics; isomerization of n-paraffins; isomerization of alkylcycloparaffins to yield cyclohexanes; isomerization of substituted aromatics; and hydrocracking of paraffins to produce gas and coke, the latter being deposited on the catalyst.

The activity of the catalyst gradually declines in reforming due to the build-up of carbonaceous deposits, or coke, on the catalyst which physically blocks the catalytically active metal and acidic sites. During operation, the temperature of the process is gradually raised to compensate for the activity loss. Eventually, however, economics dictates the necessity of reactivating the catalyst. Consequently, in all processes of this type the catalyst must necessarily be periodically regenerated by burning off the coke at controlled conditions. In the regeneration of unpromoted platinum catalysts the technique of reactivating the catalyst has required catalyst regeneration, or burning of the coke from the catalyst, this step being followed by redispersing the agglomerated metal by halogen treatment. For example, coke can be readily burned from a coked platinum catalyst by contact with an atmosphere of oxygen, or oxygen and chlorine gas, at flame front temperatures of about 540° C., and oxygen concentrations up to about 6 volume percent. The agglomerated metal can then be readily redispersed to bring the activity of the catalyst essentially back to that of a fresh catalyst. Thus, the agglomerated platinum metal is redispersed to a fine state of dispersion, with relative ease, by treatment with chloride or other halogen-containing reagent, generally used in admixture with oxygen at elevated temperatures to increase the rate of redispersion. However, not so with iridium containing, or iridium promoted platinum catalysts. At such conditions the iridium component is severely agglomerated, and the catalyst easily damaged. Iridium once agglomerated is very difficult to redisperse, and the agglomerated iridium causes carbon or coke to be retained on the catalyst. Increasing the chloride level of an iridium containing catalyst has been found to suppress agglomeration of the iridium, but the chloride combines with the more reactive carbon to form a flameproof species of coke. Hence, the reactivation of iridium containing catalysts presents a more complex problem than presented by the earlier non iridium promoted platinum catalysts.

Techniques useful for the redispersion of platinum are not directly applicable for the redispersion of iridium, or iridium in admixture with other metal hydrogenation-dehydrogenation components. Unlike platinum, large iridium and iridium oxide crystallites are formed under the conditions at which coke is readily removed, and the platinum redispersed. Once formed, the iridium and iridium oxide crystallites are not readily redispersed to their original high surface area state by a simple halogen treatment immediately following the burning operation. Recently, faced with an acute need, techniques have been developed by virtue of which iridium, or iridium in admixture with other metal hydrogenation-dehydrogenatin components, can be redispersed to a high surface area state. Patents exemplifying the state-of-the-art of regenerating, and redispersing the iridium component of iridium containing catalysts are, e.g., U.S. Pat. Nos. 3,904,510; 3,937,660; 3,939,061; 3,939,062; 3,941,682; 3,941,716; 3,943,052; 3,981,823; 3,998,755; 4,018,670; 4,046,673; 4,148,749; 4,172,817; 4,277,369; and 4,359,400. Other patents, issued by foreign governments, are GB 2,091,577A; DDR 150,986; DDR 149,846; DDR 151,556; and European patent application No. 0093621.

III. Objects

It is an object of the present invention to provide a process for the regeneration, and reactivation, of catalysts comprised of a composite of a porous inorganic oxide support and iridium, or iridium in admixture with one or more other metals, especially platinum, which have become deactivated by contact with a hydrocarbon feed at process conditions, or deactivated by burning coke from the coked catalyst, or both.

A specific object is to provide a process wherein a catalyst comprised of iridium, or admixture of iridium and another metal, or metals, especially platinum and iridium, alone or in admixture with other metals, which has become coked and thereby deactivated by contact with a hydrocarbon feed can be reactivated by burning the coke from the catalyst without agglomeration of the iridium component, and the regenerated catalyst thereby reactivated to a state approaching, or approximating that of a fresh catalyst.

A more particular object is to provide a process by virtue of which essentially all of the coke can be burned from an iridium promoted platinum catalyst without agglomeration of the iridium component of said catalyst, and the catalyst thereby reactivated (or without increase in the level of iridium agglomeration, where the catalyst is already agglomerated); but wherein, if agglomeration of the iridium component does occur during the burn the iridium agglomerates can be redispersed.

IV. The Invention

These objects and others are achieved in accordance with the present invention which embodies a process combination the sequence of steps of which include (1) a low temperature primary burn, wherein (i) the chloride level of a coked, deactivated iridium-containing catalyst is raised by contact with a dry hydrogen chloride containing gas, (ii) and coke then burned from said chlorided, iridium-containing catalyst by contact with a dry gas which contains hydrogen chloride at level sufficient to suppress iridium agglomeration at burn temperature and a level of oxygen providing temperatures which do not exceed about 425° C. sufficient to remove a preponderance of the coke without agglomeration of the iridium (or without increase in the level of iridium agglomeration, where the catalyst is already agglomerated); and (2) a high temperature secondary burn, wherein the predominantly coke depleted chlorinated iridium-containing catalyst is subjected to (iii) a chlorination step wherein the catalyst is contacted with a dry hydrogen chloride containing gas sufficient to redisperse any agglomerated iridium, particularly iridium agglomerates, produced during said low temperature primary burn, if any, and raise the chloride level of the catalyst to a yet higher level for suppression of iridium agglomeration at higher temperature than 425° C., (iv) residual coke is then burned from said higher chlorided, iridium-containing catalyst by contact with a dry gas which contains hydrogen chloride at level sufficient to suppress iridium agglomeration at the higher burn temperature, and a level of oxygen sufficient to provide temperatures greater than 425° C., and ranging as high as about 530° C., sufficient to burn the preponderance of the residual coke from the catalyst without agglomeration of the iridium (or increase in the level of iridium agglomeration, where the iridium is already agglomerated prior to initiation of the high temperature secondary regeneration sequence). Preferably, in an additional step (3) the catalyst is stripped to reduce the level of chloride by contact of the catalyst with steam, or steam and hydrogen chloride, the molar ratio of $H_2O/HCl$ being maintained within a range of from about 80:1 to about 20:1, preferably from about 50:1 to about 30:1, to reduce the chloride content of the catalyst below about 1.0 percent, based on the weight of the catalyst, this rendering the catalyst suitable for use in a catalytic reforming run wherein the catalyst is contacted with a hydrocarbon, or naphtha feed.

In initiating the primary, or low temperature primary burn step, a bed of the iridium-containing catalyst is contacted with a non-reactive or inert gas which contains hydrogen chloride, and essentially no water. The gas should be as dry as possible, and should contain no more than about 50 parts of water, preferably about 10 parts of water, per million parts by volume (vppm) of gas. The said bed is contacted and chlorided to a level ranging from about 0.9 percent to about 1.5 percent chloride, preferably from about 1.0 percent to about 1.2 percent chloride, based on the weight of the catalyst (dry basis) if the catalyst does not already contain this level of chloride. This level of chloride has been found adequate to protect, or passivate the iridium component of the catalyst against agglomeration, or significant increase in the level of agglomeration during the low temperature burn step, if the catalyst is already partially agglomerated. Hence, after the catalyst has been adequately chlorided, the low temperature burn is initiated by contacting said bed of catalyst with a gas which contains both hydrogen chloride and oxygen, the hydrogen chloride in concentration adequate to maintain the necessary protective level of chloride on the catalyst to prevent iridium agglomeration, or increased iridium agglomeration, and the oxygen in adequate concentration to provide the desired flame front temperature for burn off of the coke. In general, the gas will contain from about 10 parts per million, by volume of said gas (vppm), to about 100 vppm hydrogen chloride, preferably from about 30 vppm to about 50 vppm hydrogen chloride, and up to about 5000 parts, preferably from about 1000 to about 5000 parts oxygen, more preferably from about 2000 parts to about 4000 parts of oxygen, based on the volume of said gas, this amount of oxygen being adequate to maintain a flame front temperature not exceeding about 425° C., preferably ranging from about 375° C. to a maximum of about 425° C., more preferably from about 400° C. to about 425° C. The reaction is conducted for time sufficient for the flame front to pass through the bed and burn coke from the catalyst without agglomeration, or significant increase in agglomeration of the iridium. Generally, in the low temperature primary burn from about 60 percent to about 90 percent, preferably from about 70 percent to about 90 percent of the coke, based on the weight of the catalyst (dry basis), is removed from the catalyst.

In initiating the secondary, or higher temperature burn step, the catalyst chlorination step is conducted for the purpose of protecting the iridium component against agglomeration, or increase in the level of agglomeration, during the subsequent higher temperature burn. The catalyst is chlorinated by contact of the catalyst with a hydrogen chloride containing gas in the absence of water, which means that the hydrogen chloride containing gas should be as dry as possible, or in no event should the gas contain moisture at a level greater than about 50 parts of water, preferably greater than about 10 parts of water, per million parts by volume of the gas. In general, the gas used to carry out the catalyst chlorination step will contain up to about 5000 parts, preferably from about 100 parts to about 5000 parts of hydrogen chloride, more preferably from about 400 parts to about 3000 parts of hydrogen chloride, per million parts by volume of gas. The catalyst is contacted with such gas for a time sufficient to increase the chloride level of the catalyst to at least about 1.6 percent, based on the weight of the catalyst. At chloride concentration below this level, secondary burn conditions will produce agglomeration of the iridium. Preferably the concentration of chloride ranges between about 1.6 percent and 2.5 percent, based on the total weight of the catalyst (dry basis). Larger concentrations of chloride on the catalyst are not necessary to adequately protect the catalyst during the high temperature secondary burn. There is a trade off between the time required for adequate chlorination of the catalyst and the hydrogen chloride concentration of the gas used for chloriding the catalyst. Larger hydrogen chloride concentration in the gas thus require less contact time to adequately chlorinate the catalyst, and conversely lower hydrogen chloride concentrations in the gas require greater contact time. For example, at a gas flow rate of 27 SCF/hr/lb of catalyst, a gas containing 1600 vppm of hydrogen chloride will require about 2 hours for chlorination, and a gas containing about 100 vppm of hydrogen chloride will require about 40 hours to accomplish the same amount of chlorination. In chloriding the catalyst, it is generally adequate to use a gas containing the same or about the same concentration of hydrogen chloride as employed in chloriding the catalyst for the low temperature primary burn, though to offset the additional time required to complete chlorination of the catalyst, the concentration of hydrogen chloride can be proportionately increased taking into account the amount of halide to be deposited on the catalyst, and time required to complete the chlorination.

The high temperature secondary burn essentially completely removes the residual coke left from the low temperature primary burn without agglomeration, or increased agglomeration of the iridium component. In conducting the secondary burn, the levels of concentration of the hydrogen chloride and oxygen, respectively, in the gas, added or injected during the secondary burn, are increased as contrasted with the concentration of hydrogen chloride and oxygen employed in conducting the low temperature primary burn. A level of chloride ranging from about 100 vppm to about 5000 vppm chloride, preferably from about 150 vppm to about 3000 vppm chloride has been found effective in suppressing agglomeration of the iridium component during the secondary burn. The gas must also contain oxygen, generally up to about 5000 parts, per million parts by volume of gas (vppm), preferably from about 1000 vppm to about 5000 vppm of oxygen, more preferably from about 2000 vppm to about 4000 vppm of oxygen, this amount of oxygen being sufficient to provide a flame front temperature ranging above about 425° C. to a maximum of about 530° C., preferably from about 480° C. to about 510° C. The reaction time is sufficient for the flame front to pass through the bed of catalyst to effect at least about 90 percent burn off of the residual coke, or coke remaining from the low temperature burn, and preferably essentially complete coke removal (viz., 100 percent), based on the weight of the catalyst, without agglomeration, or increased agglomeration of the iridium component.

In conducting the primary burn, it has thus been found that hydrogen chloride in levels of about 10 vppm to about 100 vppm, preferably about 30 vppm to about 50 vppm, with the required amount of oxygen, are adequate to suppress iridium agglomeration. Occasionally however, it has been found that some iridium agglomeration can occur, e.g., as when the temperature of the primary burn exceeds about 425° F., too much moisture enters the system, or insufficient chloride is present on the catalyst to provide the required passivation. In such event, it has been found that the use in the secondary burn, of about 200 vppm hydrogen chloride, and greater, preferably from about 200 vppm to about 5000 vppm hydrogen chloride, along with the required amount of oxygen, will redisperse agglomerates of iridium that are produced during the primary burn caused by such upsets, or failure to strictly observe the specified regimen of conditions. This level of hydrogen chloride, with the required oxygen, is also adequate to remove all of the carbon from the catalyst. Moreover, in accordance with the more preferred practice of this invention, the oxygen concentration is increased, preferably in step-wise fashion, or linearly, preferably the latter, over the period of the burn to a level ranging from about 2.0 percent to about 5 percent, based on the volume of the gas. By operating in this manner somewhat greater effectiveness is achieved in burning the residual coke from the catalyst. In addition, if the catalyst contains iridium agglomerates, as may have been caused by upsets in the primary regeneration step, the agglomerates are redispersed.

Iridium agglomeration has been found to reduce the metal surface area of the catalyst, this lessening catalyst activity and catalyst activity maintenance (cycle length). Only dispersed iridium can be effective in moderating coke formation and reducing the catalyst deactivation rate; iridium agglomeration, for purposes of the present invention, being defined as the percentage of the total iridium atoms on the catalyst in clusters of 50Å, or greater, as measured by x-ray diffraction. If the conditions of the primary and secondary burn steps are carefully observed, there will be essentially no agglomeration of the iridium in burning the coke from the catalyst; in either the primary or secondary burn. An initial relatively low level of hydrogen chloride is incorporated with a coked iridium containing catalyst, optimally in amount sufficient, and at conditions sufficient to passivate the iridium component of the catalyst against agglomeration in the low temperature primary burn which removes a preponderance of the coke without agglomeration of the catalyst. Prior to initiation of the secondary burn, additional hydrogen chloride is added to the catalyst, again (1) in amount sufficient to passivate the iridium component against agglomeration in the higher temperature secondary burn which removes residual coke from the catalyst without agglomeration, or increase in the level of agglomeration, of the iridium component; and (2) in amount sufficient that, at the conditions given, any agglomerates of iridium produced in the low temperature, or primary burn step, via failure to strictly observe the required regimen of conditions, will be redispersed. No chlorine is injected into the process. Corrosion is minimized because the regeneration and reactivation of the catalyst is achieved in an essentially dry system. Reduction of the catalyst is not required.

Excessive chloride is removed from the catalyst by stripping the catalyst from the high temperature secondary burn of chloride by contact thereof with steam at temperature ranging from about 400° C. to about 500° C., preferably from about 470° C. to about 490° C. Preferably, excessive chloride is stripped from the catalyst by use of an admixture of steam and hydrogen chloride, the molar ratio of $H_2O:HCl$ ranging from about 80:1 to about 20:1, preferably from about 50:1 to about 30:1. The catalyst, after stripping will contain from about 0.8 percent to about 1.3 percent, preferably from about 0.9 percent to about 1.1 percent chloride, based on the weight of the catalyst (dry basis), at which time the regenerated catalyst is ready for use in an operating run for the conversion of a hydrocarbon feed.

The following examples are exemplary of the process of this invention. In the examples which follow, pressures are given in terms of megapascal's (MPa), temperatures in terms of degrees Centigrade, gas flow rates in terms of SCF/hr/lb catalyst, and all parts and percentages are expressed in terms of weight units except as otherwise expressed.

EXAMPLE 1

A coke deactivated platinum-iridium catalyst (0.3% Pt, 0.3% Ir/$Al_2O_3$) which contained about 3.1 wt. % carbon, 0.9% chloride, and which contained 17 wt. % agglomerated iridium as measured by x-ray diffraction, was regenerated in the following manner.

Primary Burn

The level of chloride on the catalyst was raised from 0.9% to 1.1% by contact with a dry nitrogen gas which contained 30 vppm HCl. The primary burn was then conducted, while gas was continuously injected into the reactor, at the following conditions.

| | |
|---|---|
| Pressure, MPa | 0.53 |
| Temperature, °C. | 425 maximum flame front |
| Gas Composition | |
| O$_2$, volume percent | 0.2 |
| HCl, volume ppm | 30 |
| N$_2$ | remainder |
| Gas Rate SCF/hr/lb cat | 27 |
| Duration | about 24 hours; until flame front has passed through catalyst bed. |

On completion of the burn, of duration approximating 24 hours, the catalyst contained 0.5 of unburned coke remaining on the catalyst. The amount of iridium agglomerates remaining on the catalyst, determined by the size of the crystallites of iridium greater than 50Å as measured by x-ray diffraction remained at 17 wt. %.

Catalyst Chlorination

The level of chloride on the catalyst was raised from 1.1% to 2% by contact with nitrogen which contained hydrogen chloride in 2500 vppm concentration. The time required for the chlorination approximated 4 hours.

Secondary Burn

The secondary burn was conducted, while the gas employed in the catalyst chlorination was continuously injected into the reactor, at the following conditions.

| | |
|---|---|
| Pressure, MPa | 0.5 |
| Temperature, °C. | 510 |
| Gas Composition | |
| O$_2$, volume percent | Increased linearly with time from 0.2 to 3.0 |
| HCl, volume ppm | 200 |
| N$_2$ | remainder |
| Gas Rate SCF/hr/lb cat | 27 |
| Duration hours | 6 |

On completion of the burn at the end of 6 hours, analysis showed that less than 0.1 percent of carbon remained on the catalyst. The catalyst showed no signs of iridium agglomeration by measurement with x-ray diffraction.

Steam Stripping

The catalyst was contacted with steam at 480° C. for a period of 2 hours, at the end of which time the catalyst contained 0.9% chloride. The catalyst showed no sign of iridium agglomeration.

EXAMPLE 2

In this example a coke deactivated platinum-iridium catalyst (0.3% Pt, 0.3% Ir/Al$_2$O$_3$) which contained 5 wt. % carbon and 0.9% chloride was regenerated.

26% of the iridium metal had been agglomerated in a previous burn and this metal was in clusters of greater than 50Å as measured by x-ray diffraction. The primary burn and chlorination procedures outlined in Example 1 were again used on this catalyst. At this point in time, the carbon content was found to be 0.6 wt. %, and x-ray diffraction measurement showed that catalyst contained 26 wt. % iridium agglomeration.

Catalyst Chlorination

Chlorination of the catalyst was carried out at the conditions given, as follows:

| | |
|---|---|
| HCl Content of Gas, vppm | 3000 |
| Duration, Hours | 3 |
| Final Chloride on Catalyst, Wt. % | 2 |

Secondary Burn

The secondary burn was conducted while the gas employed in the catalyst chlorination was continuously injected into the reactor at the following conditions initially:

| | |
|---|---|
| Pressure, MPa | 0.53 |
| Temperature, °C. | 500 |
| Gas Composition | |
| O$_2$, volume percent | Increased linearly with time from 0.5 to 3.0 |
| HCl, volume ppm | 150 |
| N$_2$ | remainder |
| Gas Rate SCF/hr/lb cat | 27 |
| Duration hours | 6 |

The amount of oxygen was linearly increased over a six hour period from 0.5 volume % to 3 volume % at the end of the period. On termination of the secondary burn, chloride was stripped from the catalyst according to the procedure described in Example 1. Analysis showed that less than 0.1% carbon remained on the catalyst and x-ray diffraction analysis did not show the presence of agglomerates of iridium greater than 50Å in size.

The metal hydrogenation-dehydrogenation component, or components, of the catalyst can be associated or composited with the porous refractory inorganic oxide by various methods known to the art. It is generally added to the catalyst in concentration ranging from about 0.01 percent to about 10 percent, preferably from about 0.1 to about 2 percent, based on the weight of the catalyst (dry basis). An especially preferred catalyst is one which contains from about 0.01 to about 2 weight percent platinum, preferably from about 0.1 to about 0.6 weight percent platinum, and from about 0.01 to about 2 weight percent iridium, preferably from about 0.1 to about 0.6 weight percent iridium, on alumina. Where there is more than one component, the several components can be disposed on the porous inorganic oxide support in intimate admixture with each other by a suitable technique such as ion exchange, coprecipitation, impregnation, or the like. It is not necessary that the components be incorporated onto the porous inorganic oxide support by the same technique. One component can be composited with the porous inorganic oxide by one method such as, for example, coprecipitation, and the other component associated with the porous inorganic oxide by another technique, i.e., impregnation. Furthermore, the components can be composited with the porous inorganic oxide either sequentially or simultaneously. It is generally preferred that the components be associated with the porous inorganic oxide by impregnation, either sequentially or simultaneously.

The metal, or metals, can be added in essentially any soluble form of the respective metal, or metals, together in the same solution or in sequence as, e.g., soluble salts, acids or other form of compounds. For example, iridium or platinum, or both, can be incorporated with a porous inorganic support in intimate admixture therewith by any suitable technique such as ion exchange, coprecipitation, impregnation, or the like. It is not essential that separate metal components be incorporated onto the porous inorganic oxide by the same technique. One metal, e.g., iridium can be associated with the porous inorganic oxide by one method, e.g., coprecipitation, and the other component, e.g., platinum, by another technique, e.g., impregnation, or vice versa. To incorporate, e.g., platinum onto a porous inorganic oxide support, impregnation with chloroplatinic acid is preferred but other platinum group compounds can be used such as ammonium chloroplatinates, polyamine platinum salts, platinum chloride, and the like. Iridium is suitably incorporated onto a support with periridic acid, ammonium or potassium salts of iridium, and the like. Other metal promoters, e.g., other Group VIII metal components, tin, tungsten, iron, rhenium, lead, germanium, and the like, can also be incorporated onto a porous inorganic oxide with iridium, or iridium and platinum, in similar manner.

Suitably, mildly or moderately acidic refractory oxides are employed as supports, e.g., silica, silica alumina, magnesia, thoria, boria, titania, zirconia, various spinels, and the like, including in particular alumina which is preferred. High surface area catalysts, or catalysts having surface areas ranging upwardly from about 50 square meters per gram (B.E.T. Method) are preferred. In particular, catalysts having surface areas ranging from about 100 to 250 square meters per gram, and higher, prove quite satisfactory.

In formation of the more active catalysts, refractory inorganic oxides of desired particle size distribution, in dry state, can be contacted, admixed, or otherwise incorporated with metal-containing solution, or solutions, and thereby impregnated. The refractory inorganic oxide can thus be pilled, pelleted, beaded, or extruded, alone or in admixture with other materials, and dried and crushed to form particles of desired size ranging, e.g., from about 0.1 to about 0.4 inch, and preferably from about 0.2 to about 0.3, average diameter. The material can then be treated by contact with a solution containing the desired amount of metal, or metals, or treated sequentially by contact with a solution containing one metal and then the other, in the desired amounts. On the other hand, larger particles can be so-treated and then crushed to the desired size. The particulate mass, in either instance, can be dried and calcined, and contacted with hydrogen, generated in situ or ex situ, to reduce the salt. Suitably, also, the catalyst composite can be formed by adding together suitable reagents such as salts of a metal, or metals, and ammonium hydroxide or ammonium carbonate, and a salt of alumina such as aluminum chloride and aluminum sulfate to form aluminum hydroxide. The aluminum hydroxide containing the salts of the metal, or metals, can then be heated, dried, and simultaneously converted to alumina and/or further impregnated with a metal, or metals, if desired. The material can then be calcined and then hydrogen-treated, in situ or ex situ, to reduce the salts and complete the formation of the catalyst composite.

Essentially any petroleum or hydrocarbon fraction containing paraffins, naphthenes, and the like, can be reformed and the catalyst regenerated. A suitable feed, e.g., a naphtha, either virgin or cracked, Fischer-Tropsch or mixtures thereof, is contacted at reforming conditions in the presence of hydrogen with a catalyst composite including the support which contains catalytically active amounts of iridium or admixtures of iridium and platinum, or iridium and platinum with other metals. Typical feed stream hydrocarbon molecules are those containing from about 5 to about 12 carbon atoms, or more preferably from about 7 to about 9 carbon atoms. Naphthas, or petroleum fractions boiling within the range of from about 80° F. to about 375° F., contain hydrocarbons of carbon numbers within these ranges. Typical fractions thus usually contain from about 20 to about 80 volume percent of paraffins, both normal and branched, which fall in the range of about $C_5$ to $C_{12}$, and 5 through about 20 volume percent of the desirable aromatics falling within the range of from about $C_6$ to $C_{12}$.

It is apparent that various other modifications and changes can be made without departing the spirit and scope of the invention.

Having described the invention, what is claimed is:

1. In a process for the catalytic conversion of hydrocarbons wherein a hydrocarbon feedstock is contacted with a catalyst comprised of an iridium component composited with a porous refractory inorganic oxide support at hydrocarbon conversion conditions, the catalyst having been at least partially deactivated during contact with said feedstock by coke deposition thereon, said catalyst having been regenerated after discontinuing contact of said catalyst with said feedstock in a series of steps which include
   (i) providing a bed of said catalyst in a reaction zone with a chloride level on the catalyst ranging from about 0.9 percent to about 1.5 percent, based on the weight of the catalyst,
   (ii) burning a preponderance of the coke from the catalyst while adding a gas containing hydrogen chloride sufficient to maintain the chloride level on the catalyst within a range of from about 0.9 percent to about 1.5 percent, based on the weight of the catalyst, and oxygen in concentration ranging up to about 5000 parts, based on the volume of gas, to provide a flame front temperature not exceeding about 425° C. sufficient to burn the coke from the catalyst, but wherein the iridium component of the catalyst is agglomerated as via inadvertent departure from the prescribed burn conditions,
   (iii) the chloride level of the catalyst is increased further to at least about 1.6 percent, based on the weight of the catalyst,
   the improvement comprising
   contacting said catalyst subsequent to raising the chloride level of the catalyst as in (iii) with a gas containing hydrogen chloride in concentration ranging from about 150 parts to about 5000 parts, based on the volume of the gas, and up to about 5000 parts per million parts oxygen, based on the volume of the gas to provide a flame front temperature greater than about 425° C. sufficient to redisperse the agglomerated iridium and substantially complete the removal of coke from the catalyst.

2. The process of claim 1 wherein the bed of catalyst in (i) is contacted with a hydrogen chloride gas to provide the required level of chloride on the catalyst.

3. The process of claim 1 wherein the bed of catalyst in (i) is contacted with a gaseous hydrogen chloride mixture sufficient to provide a chloride level on the catalyst ranging from about 1.0 percent to about 1.2 percent, based on the weight of the catalyst.

4. The process of claim 1 wherein the bed of catalyst in (ii) is contacted with a gas containing hydrogen chloride sufficient to maintain the chloride level within a range of from about 1.0 percent to about 1.2 percent, and oxygen in concentration ranging from about 2000 parts to about 4000 parts, based on the volume of the gas.

5. The process of claim 1 wherein the chloride level of the bed of catalyst in (iii) is increased up to about 2.5 percent by contact with the gas, and the level of oxygen is maintained with a range of from about 2000 parts to about 5000 parts, per million parts of gas, in burning the coke from the catalyst.

6. The process of claim 1 wherein the flame front temperature in (iii) is maintained at from about 425° C. to about 530° C. in burning the coke from the catalyst.

7. The process of claim 1 wherein the chloride is stripped from the catalyst subsequent to step (iii) by contact with steam.

8. The process of claim 7 wherein the steam is admixed with hydrogen chloride in molar ratio of $H_2O:HCl$ ranging from about 80:1 to about 20:1.

9. The process of claim 8 wherein the ratio of $H_2O:HCl$ ranges from about 50:1 to about 30:1.

10. In a process for the catalytic reforming of a naphtha feedstock wherein a naphtha feedstock is contacted at reforming conditions with a reforming catalyst containing an iridium component composited with an alumina support, the catalyst having been at least partially deactivated during contact with said naphtha by the deposition of coke thereupon, said catalyst having been regenerated after discontinuing contact of said catalyst with said naphtha in a series of steps which include
(i) providing a bed of said catalyst in a reaction zone with a chloride level on the catalyst ranging from about 0.9 percent to about 1.5 percent, based on the weight of the catalyst,
(ii) burning a preponderance of the coke from the catalyst while adding a gas containing hydrogen chloride sufficient to maintain the chloride level on the catalyst within a range of from about 0.9 percent to about 1.5 percent, based on the weight of the catalyst, and oxygen in concentration ranging up to about 5000 parts, based on the volume of the gas, to provide a flame front temperature not exceeding about 425° C. sufficient to burn the coke from the catalyst but wherein the iridium component of the catalyst is agglomerated as via inadvertent departure from the prescribed burn conditions,
(iii) the chloride level of the catalyst is increased further to at least about 1.6 percent, based on the weight of the catalyst,
the improvement comprising
contacting said catalyst subsequent to raising the chloride level of the catalyst as in (iii) with a gas containing hydrogen chloride in concentration ranging from about 150 parts up to about 5000 parts, per million parts, based on the volume of the gas, and up to about 5000 parts per million parts oxygen, based on the volume of the gas, to provide a flame front temperature greater than about 425° C. sufficient to redisperse the agglomerated iridium and substantially complete the removal of coke from the catalyst.

11. The process of claim 10 wherein the bed of catalyst in (i) is contacted with a hydrogen chloride gas to provide the required level of chloride on the catalyst.

12. The process of claim 10 wherein the bed of catalyst in (i) is contacted with a gaseous hydrogen chloride mixture sufficient to provide a chloride level on the catalyst ranging from about 1.0 percent to about 1.2 percent, based on the weight of the catalyst.

13. The process of claim 10 wherein the bed of catalyst in (ii) is contacted with a gas containing hydrogen chloride sufficient to maintain the chloride level within a range of from about 1.0 percent to about 1.2 percent, and oxygen in concentration ranging from about 2000 parts to about 4000 parts, based on the volume of the gas.

14. The process of claim 10 wherein the concentration of hydrogen chloride and oxygen in (iii) is gradually increased throughout the burn period.

15. The process of claim 10 wherein the chloride level of the bed of catalyst in (iii) is increased up to about 2.6 percent by contact with the gas, and the level of oxygen is maintained within a range of from about 2000 parts to about 5000 parts in burning the coke from the catalyst.

16. The process of claim 10 wherein in (iii) the flame front temperature is maintained at from about 425° C. to about 530° C. in burning the coke from the catalyst.

17. In a process for the catalytic reforming of a naphtha feedstock wherein a naphtha feedstock is contacted at reforming conditions with a platinum reforming catalyst containing an additional iridium component composited with an alumina support, the catalyst having been at least partially deactivated during reforming by reforming by contact with said naphtha by the deposition of coke thereupon, said catalyst having been regenerated after discontinuing contact of said catalyst with said naphtha in a series of steps which include
(i) providing a bed of said catalyst in a reaction zone with a chloride level on the catalyst ranging from about 1.0 percent to about 1.2 percent, based on the weight of the catalyst,
(ii) burning a preponderance of the coke from the catalyst while adding a gas containing hydrogen chloride sufficient to maintain the chloride level within a range of from about 0.9 percent to about 1.5 percent, based on the weight of the catalyst, and oxygen in concentration ranging up to about 5000 parts, based on the volume of the gas, to provide a flame front temperature not exceeding about 425° C. sufficient to burn the coke from the catalyst but wherein the iridium component of the catalyst is agglomerated as via inadvertent departure from the prescribed burn conditions,
(iii) the chloride level of the catalyst is measured further to at least about 1.6 percent, based on the weight of the catalyst,
the improvement comprising
contacting said catalyst subsequent to raising the chloride level of the catalyst as in (iii) with a gas containing hydrogen chloride at up to about 5000 parts, based on the volume of the gas, and up to about 5000 parts, per million parts of oxygen, based on the volume of the gas, to provide a flame front temperature greater than about 425° C. sufficient to redisperse the agglomerated iridium and substantially complete the removal of coke from the catalyst.

18. In a process for the catalytic reforming of a naphtha feedstock wherein a naphtha feedstock is contacted at reforming conditions with a platinum reforming catalyst containing an additional iridium component composited with an alumina support, the catalyst having been at least partially deactivated during contact with said naphtha by the deposition of coke thereupon, said catalyst having been regenerated after discontinuing contact of said catalyst with said naphtha in a series of steps which include (i) contacting a bed of said catalyst in a reaction zone with a gaseous mixture containing hydrogen chloride sufficient to provide a chloride level on the catalyst ranging from about 1.0 percent to about 1.2 percent, based on the weight of the catalyst, (ii) burning a preponderance of the coke from the catalyst while adding a gas containing hydrogen chloride sufficient to maintain the chloride level within a range of from about 1.0 percent to about 1.2 percent, based on the weight of the catalyst, and up to about 5000 parts oxygen, based on the volume of the gas, to provide a flame front temperature not exceeding about 425° C. sufficient to burn the coke from the catalyst but wherein the iridium component of the catalyst is agglomerated as via inadvertent departure from the prescribed burn conditions, (iii) the chloride level of the catalyst subsequent to raising the chloride level of the catalyst as in (iii) is increased further to form about 1.6 percent to about 2.5 percent, based on the weight of the catalyst, by contacting said catalyst with a gas containing up to 5000 wppm hydrogen chloride, and up to about 5000 parts oxygen, based on the volume of the gas, to provide a flame front temperature greater than about 425° C. sufficient to redisperse the agglomerated iridium and substantially complete the removal of coke from the catalyst, and (iv) contacting the bed of catalyst with steam sufficient to reduce the chloride level on the catalyst within a range of from about 0.9 percent to about 1.1 percent, based on the weight of the catalyst.

* * * * *